United States Patent
Pedley et al.

(10) Patent No.: US 6,325,337 B1
(45) Date of Patent: Dec. 4, 2001

(54) CONNECTOR FOR CABLE SUPPORT APPARATUS

(75) Inventors: John W. Pedley, Brisbane; Ronald J. Reinke, Murarrie Brisbane; Bruce J. Ogden, Menai, all of (AU)

(73) Assignee: Framatome Connectors International, Courbevoie (FR)

(*) Notice: Subject to any disclaimer, the term of this patent is extended or adjusted under 35 U.S.C. 154(b) by 0 days.

(21) Appl. No.: 09/547,383

(22) Filed: Apr. 11, 2000

(30) Foreign Application Priority Data

Apr. 12, 1999 (AU) .................................................. 23712/99
Dec. 21, 1999 (AU) .................................................. 65375/99

(51) Int. Cl.⁷ ...................................................... F16L 3/22
(52) U.S. Cl. ............................ 248/68.1; 248/49; 248/71; 403/294
(58) Field of Search ............................... 248/49, 68.1, 71; 174/164, 165, 166; 403/286, 292, 293, 294; 24/697.1, 573.1

(56) References Cited

U.S. PATENT DOCUMENTS

| | | | |
|---|---|---|---|
| 379,688 | * | 3/1888 | Dennis . |
| 841,998 | * | 1/1907 | Mulford . |
| 1,720,309 | * | 7/1929 | Wakefield . |
| 2,745,133 | * | 5/1956 | McWethy . |
| 3,849,012 | * | 11/1974 | Krouse . |
| 4,432,519 | | 2/1984 | Wright ................................. 248/49 |
| 5,052,846 | * | 10/1991 | Behshid . |
| 5,129,613 | * | 7/1992 | Lloyd et al. . |
| 5,316,244 | * | 5/1994 | Zetena, Jr. . |
| 5,333,822 | * | 8/1994 | Benoit et al. . |
| 5,871,182 | * | 2/1999 | Johnson et al. . |
| 6,000,187 | * | 12/1999 | Shimizu . |

* cited by examiner

Primary Examiner—Ramon O. Ramirez
Assistant Examiner—Korie Chan
(74) Attorney, Agent, or Firm—Perman & Green, LLP

(57) ABSTRACT

A connector for use in joining adjacent support sections of a cable support assembly. The support section includes a wall having connector mounting apertures therein. The connector includes a main body and a plurality of fasteners extending from a fastener mounting surface of the main body. Each fastener includes a shank and a generally resiliently deformable head portion in the region of the free end of the shank. The head portion is deformable so that it can pass through a respective one of the mounting apertures of one of the support sections and subsequently adopt a configuration where, when the connector is in a fitted position retraction of the fastener head through the mounting aperture in the support section is inhibited.

15 Claims, 5 Drawing Sheets

CONNECTOR FOR CABLE SUPPORT APPARATUS

BACKGROUND OF THE INVENTION

1. Field of the Invention

This invention relates generally to a connector suitable for use in connecting articles together such as for example components of cable support apparatus.

2. Description of the Prior Art

Cable support apparatus which form a rigid structure for supporting cables are known and typically comprise a series of tray sections of selected length and shape which are connected together to form a cable support structure of selected configuration. These tray sections are adopted to be attached to a building wall or other structure. It is the current practice to interconnect adjacent tray sections by means of connectors sometimes referred to as fish plates. The currently used fish plates which are bolted to adjacent tray sections so as to hold the sections together. A typical system is described in U.S. Pat. No. 4,432,519.

SUMMARY OF THE INVENTION

It is an object of the present invention to provide an improved connector which is suitable for use with table support apparatus.

According to the present invention there is provided a connector for use in joining adjacent support sections of a cable support assembly, the support sections including a wall having connector mounting apertures therein; the connector including a main body and a plurality of fasteners extending from a fastener mounting surface of the main body, each fastener including a shank and a generally resiliently deformable head portion in the region of the free end of the shank, the head portion being deformable so that it can pass through a respective one of the mounting apertures of one of the support sections and subsequently adopt a configuration where, when the connector is in a fitted position retraction of the fastener head through the mounting aperture in the support section is inhibited.

The main body may, in one form, include a channel shaped plate which includes a main connector web one surface of which defines the fastener mounting surface and opposed flanges on opposite sides of the connector Web and the flanges extending from the web to either side of the fastener mounting surface thereof.

Preferably, the flanges form side rails which in the fitted position overlie the edges of the cable support sections. These flanges improve the load carrying capacity and restrict movement of the tray sections.

In one preferred form, the main body may be formed of plastics material such as Nylon™. Preferably, the nylon includes glass fibre therein. Any suitable manufacturing technique can be used to form the main body, for example, it may be moulded.

The connector may further include an electrical conductive element operatively connected to the main body so that in the assembled position abuts against the sections of the cable support assembly. The electrical conductive element may be urged in abutment against the sections by biassing means.

Preferably, the electrical conductive element includes a plate which includes mounting apertures therein through which the fastenings pass for movement relative thereto. In this way the plates is held on the main body of the connector. Preferably, the electrical conducting element is formed from copper foil.

There may further be provided biassing means for urging the electrical conductive element into abutment with the section of the support assembly when in the assembled position. In one preferred form, the biassing means may include one or more leaf springs secured to the main body. Preferably, the leaf springs are moulded to the main body. The purpose of the leaf springs is to increase the surface contact pressure of the plate in the wall of the tray sections. In another form of the invention the electrical conductive element may be integral with the main body. For example, it may be defined by the biassing means.

Preferably, the head portion of each fastener is generally arrow shaped or wedge shaped.

Preferably, the fastenings are moulded to the main body.

It is a further object of the present invention to provide a further modified connector which is suitable for use with cable support apparatus.

According to the present invention there is provided a connector for use in joining adjacent sections of a cable support assembly. the sections including a wall having connector mounting apertures therein; the connector including a main body and a plurality of fastenings extending from a surface of the main body, each fastening including a shank portion and a generally resiliently deformable head portion in the region of the free end of the shank, the head portion being deformable so that it can pass through a respective one of the mounting apertures of one of the sections and in a fitted position subsequently adopt a configuration where retraction of the fastener head through the mounting aperture is inhibited, the connector further including biassing means which when the connector is in the fitted position, causes a biassing force towards the walls of the sections of the cable support assembly, said biassing means including one or more substantially resilient tabs in the main body of the connector, the or each said tab being configured so that in the fitted position the or each tab causes said biassing force.

Preferably, the or each tab includes a projecting portion which in an unstressed state projects from the main body. Preferably, the or each tab may be in the form of a substantially U-shaped cut out portion of the main body of the connector. Preferably, the free edge section of the U-shaped tab is of greater thickness than the remaining portion of the tab and thereby defines the projecting portion. In one particular embodiment, there are at least two tabs, the tabs being oriented in reverse configuration relative to one another.

preferably, the main body includes a channel shaped plate which includes a main connector web and opposed flanges on opposite sides of the connector web and extending from the web with the surface thereof Preferably, the electrical conductive element includes a plate which includes mounting apertures therein through which the fastenings pass for movement relative thereto.

BRIEF DESCRIPTION OF THE DRAWINGS

Example embodiments of the connector according to the present invention are hereinafter described with reference to the accompanying drawings in which.

DESCRIPTION OF THE PREFERRED EMBODIMENT

Figure 1:
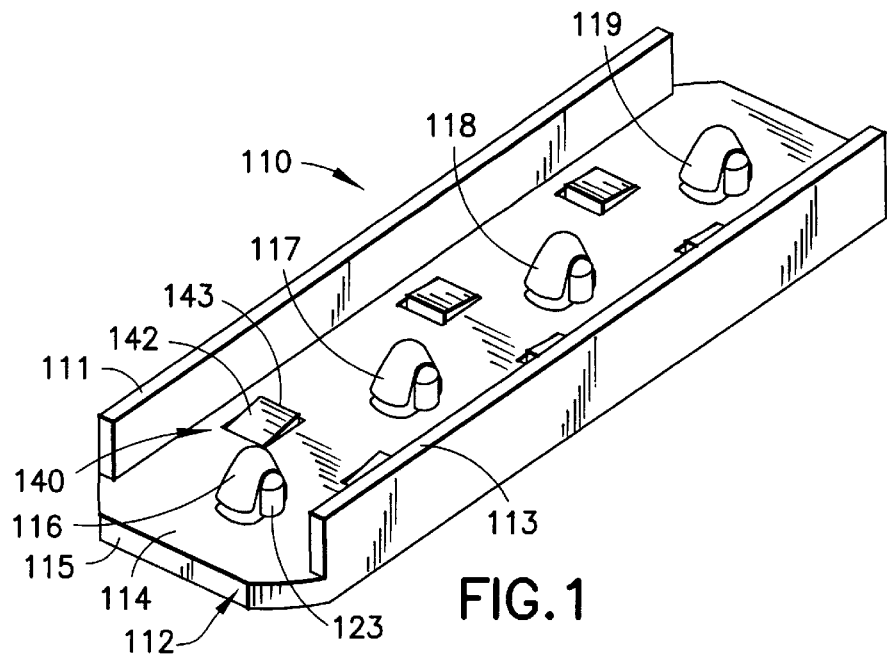
FIG. 1 is a schematic isometric view of a connector according to the present invention.
Figure 3:
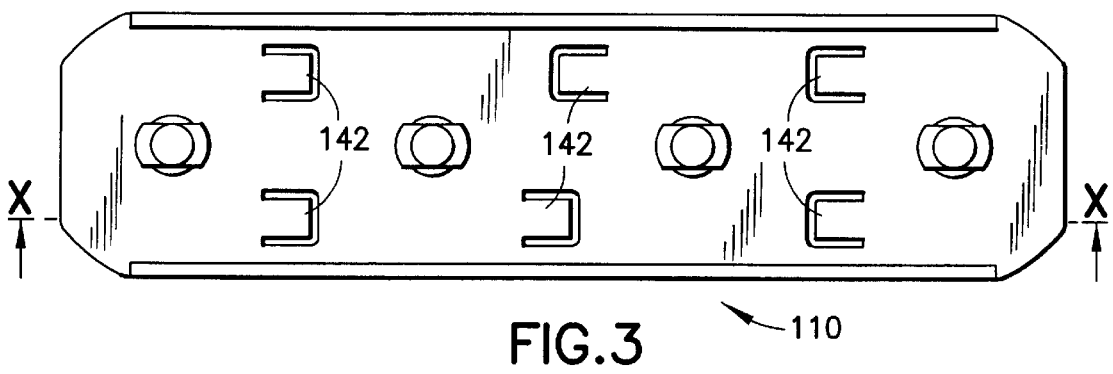
FIG. 3 is a front elevation of the connector shown in FIG. 1.
Figure 4:
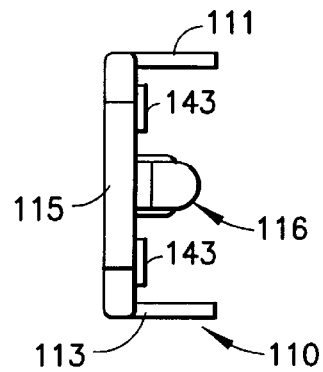
FIG. 4 is an end elevation of the connector shown in FIGS. 1 and 2.
Figure 2:
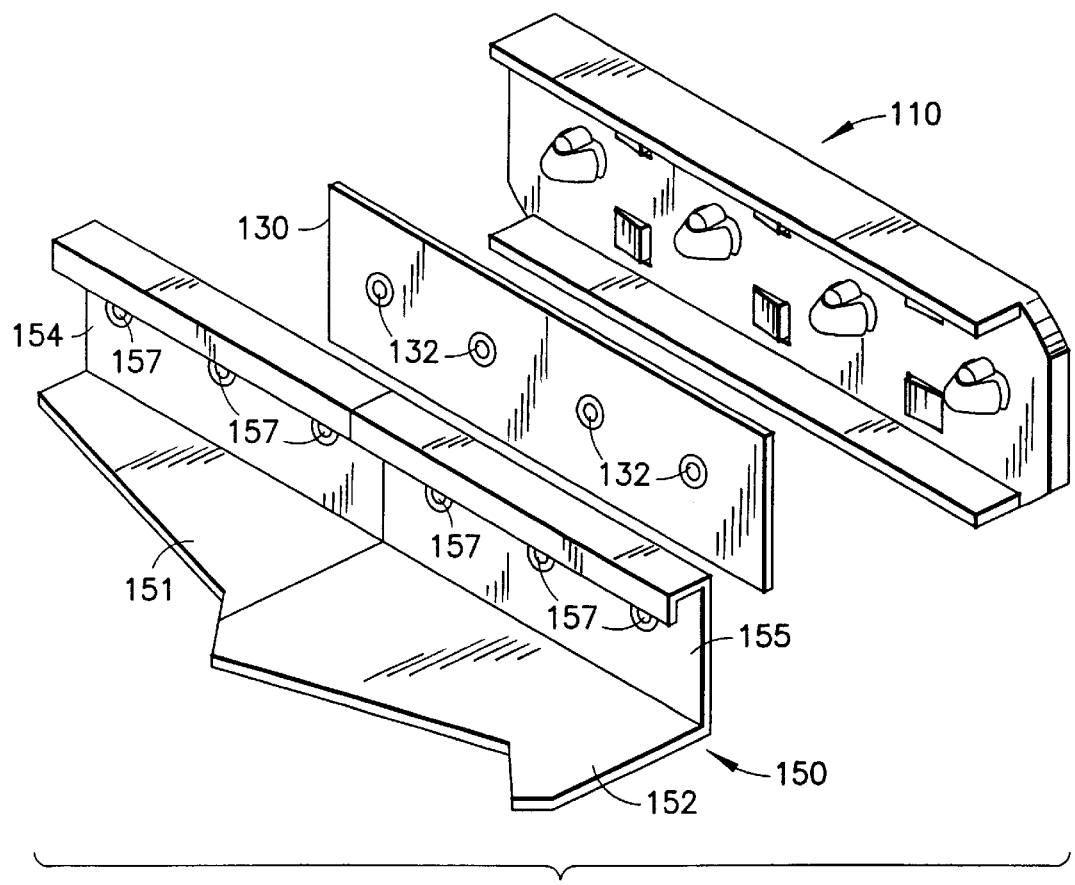
FIG. 2 is an exploded view of a connector according to the invention together with a portion of cable support trays.
Figure 5:
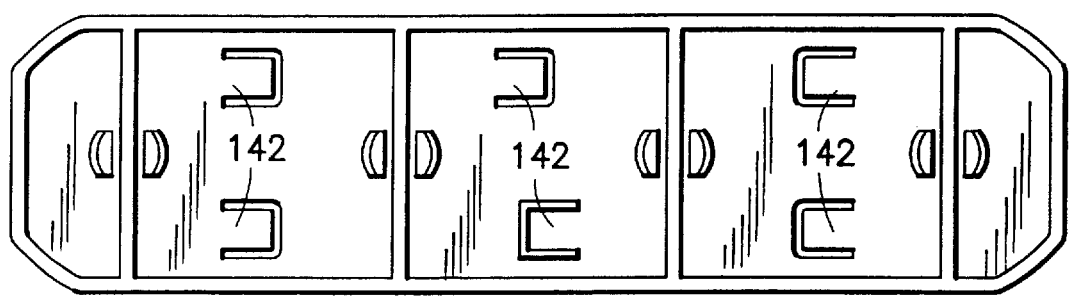
FIG. 5 is a rear elevation of the connector shown in FIG. 1.
Figure 6:
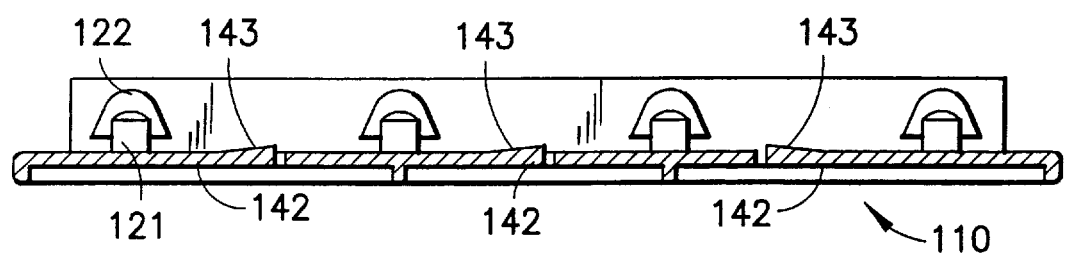
FIG. 6 is a sectional view taken along the sectional line X in FIG. 3.
Figure 7:
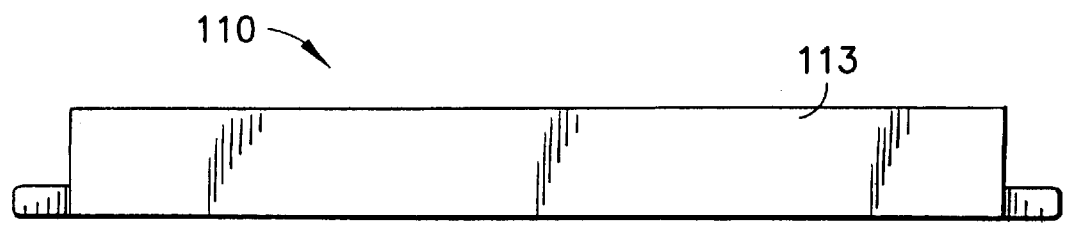
FIG. 7 is a side elevation of the connector shown in FIG. 1.

Referring to FIGS. 1 to 7 of the drawings there is shown a connector generally indicated at 110 for use in joining adjacent support sections 151 and 152 of a cable support assembly 150 (see FIG. 2). The support sections 151 and 152 of the assembly each include a wall 154, 155 having connector mounting apertures 157 therein. The connector 110 includes a main body 112 and a plurality of fasteners 116, 117, 118 and 119 extending from a fastener mounting surface 114 of the main body 112. The main body 112 is a channel shaped plate which includes a main connector web 115 and opposed flanges 111 and 113 on opposite sides of the connector web and the flanges extending from web to either side of the fastener mounting 114 thereof. The flanges 111 and 113 form side rails which in the fitted position overlie the edges of the walls 154 and 155 of the cable support sections 151 and 152.

Each fastener includes a shank 121 and a generally resiliently deformable head portion 122 in the region of the free end of the shank. The head portion 122 is arrow shaped and is deformable so that it can pass through a respective one of the mounting apertures 157 of the support sections 151 and 152 so that when the connector is in a fitted position-retraction of the fastener head through the mounting aperture in the support section is inhibited. The main body is formed of moulded nylon with glass fibre therein. Each shank 121 may include two curved locating sections 123 which assist in locating the fastener in the apertures 132 in the electrical conductive element described hereinafter and apertures 157 of the support sections.

In the embodiment shown, the connector 110 further includes an electrical conductive element 130 in the form of a copper plate which is operatively connected to the main body so that in the fitted position it abuts against the walls 154 and 155 of the sections of the cable support assembly. The plate 130 includes mounting apertures 132 therein through which the fastenings pass.

Biassing means 140 is provided for urging the electrical conductive element 130 into abutment with The walls 154 and 155 of the sections of the support assembly when in the fitted position. As shown, the biassing means 140 includes a series of resilient tabs 142 moulded into the main body. The tabs 142 are in the form of a generally U-shaped cut out and have an enlarged end portion 143 which causes the tabs to deflect when in the fitted position. It will be appreciated that in some circumstances the element 130 may not be required. In such circumstances the resilient tabs serve to maintain the connector in a firm fitted position.

To assemble the connector and tray sections together the copper strip 130 clips over the arrow shaped protrusions 122 of the fasteners of connector body. The arrow heads 122 compress down to fit through the apertures 132 of the copper strip 130 and spring back into this original position after the copper strip is clipped to the connector body.

The resilient tabs 142 on the body force the copper strip 130 forward. The connector is then pushed onto the tray sections. The arrow heads 122 once again compress down and spring back into position to secure the connector and copper strip to the tray sections.

Figures 8, 9:
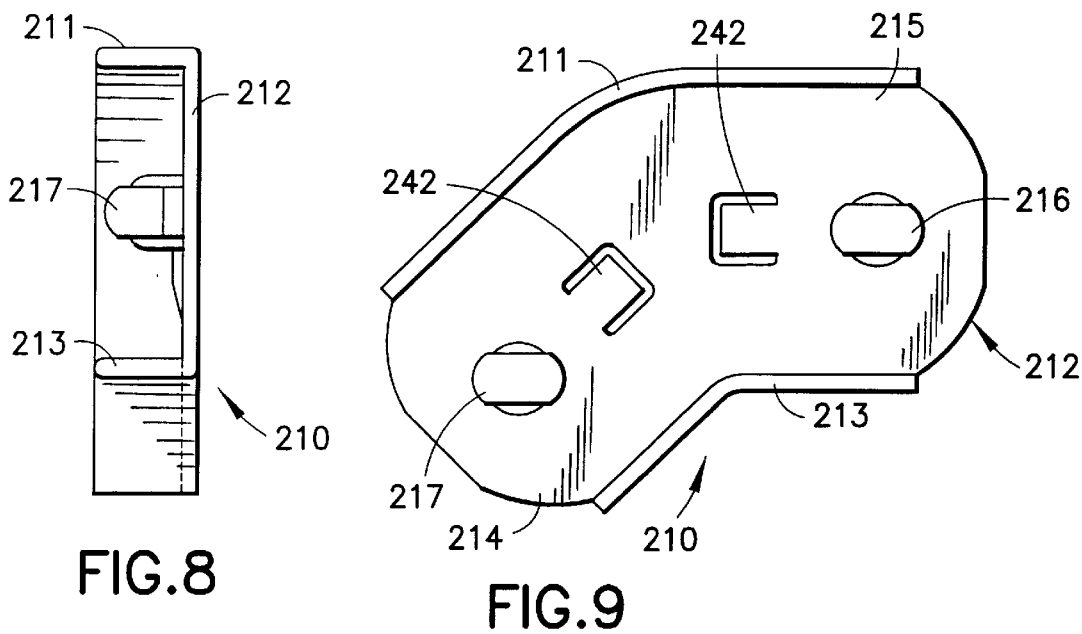
FIG. 8 is a end elevation of a connector according to a further embodiment of the invention.
FIG. 9 is a front elevation of the connector shown in FIG. 8.

FIGS. 8 and 9 illustrate a further embodiment of connector in which the various parts function in substantially the same fashion as those similar parts described with reference to FIGS. 1 to 7.

As shown in FIGS. 8 and 9 there is a connector 210 which includes a main body 212 which comprises two leg sections 214 and 215 which are inclined to one another so that the main body is generally V-shaped. The main body further includes flanges 211 and 213 on opposite sides of the main body. The connector further includes fasteners 216 and 217 and biassing tabs 242. The fasteners and tabs are of the same structure as those described earlier with reference to FIGS. 1 to 7. This connector can be used to connect two sections of a cable support assembly for example which are inclined to one another.

Figures 10, 11:
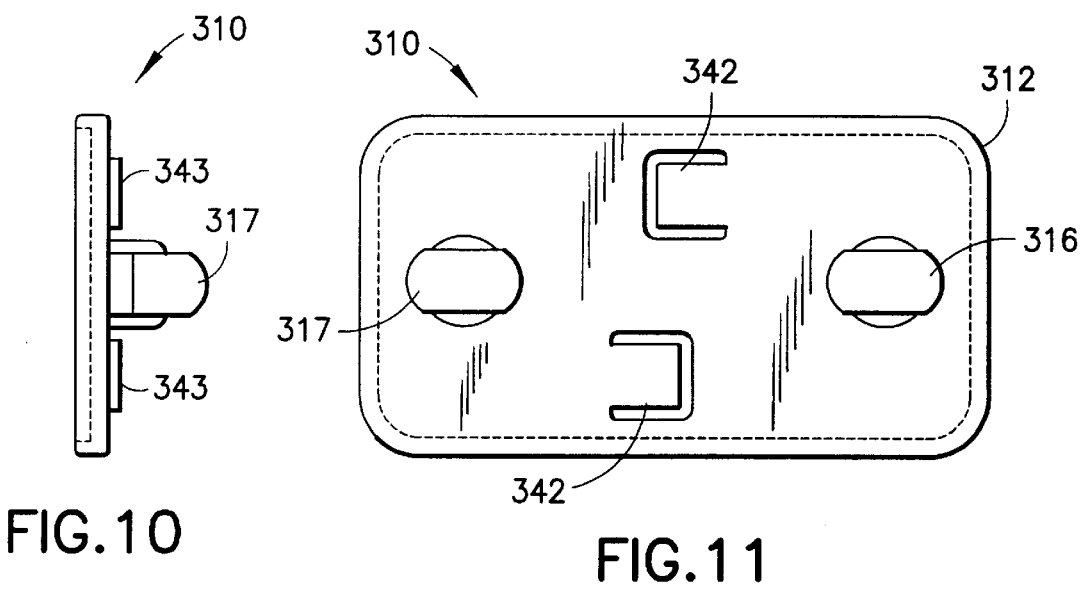
FIG. 10 is an end elevation of a connector according to yet another embodiment of the invention.
FIG. 11 is a front elevation of the connector shown in FIG. 10.

A further form of connector is shown in FIGS. 10 and 11. In this embodiment the connector 310 includes a main body 312 in the form of a flat plate with fasteners 316 and 317 thereof. Biassing tabs 342 are interposed between the fasteners and again the tabs and fasteners are of the same structure as previously described with reference to the earlier embodiments.

Preferably in each embodiment the connector is moulded as an integral unit from glass filled nylon.

Figure 12:
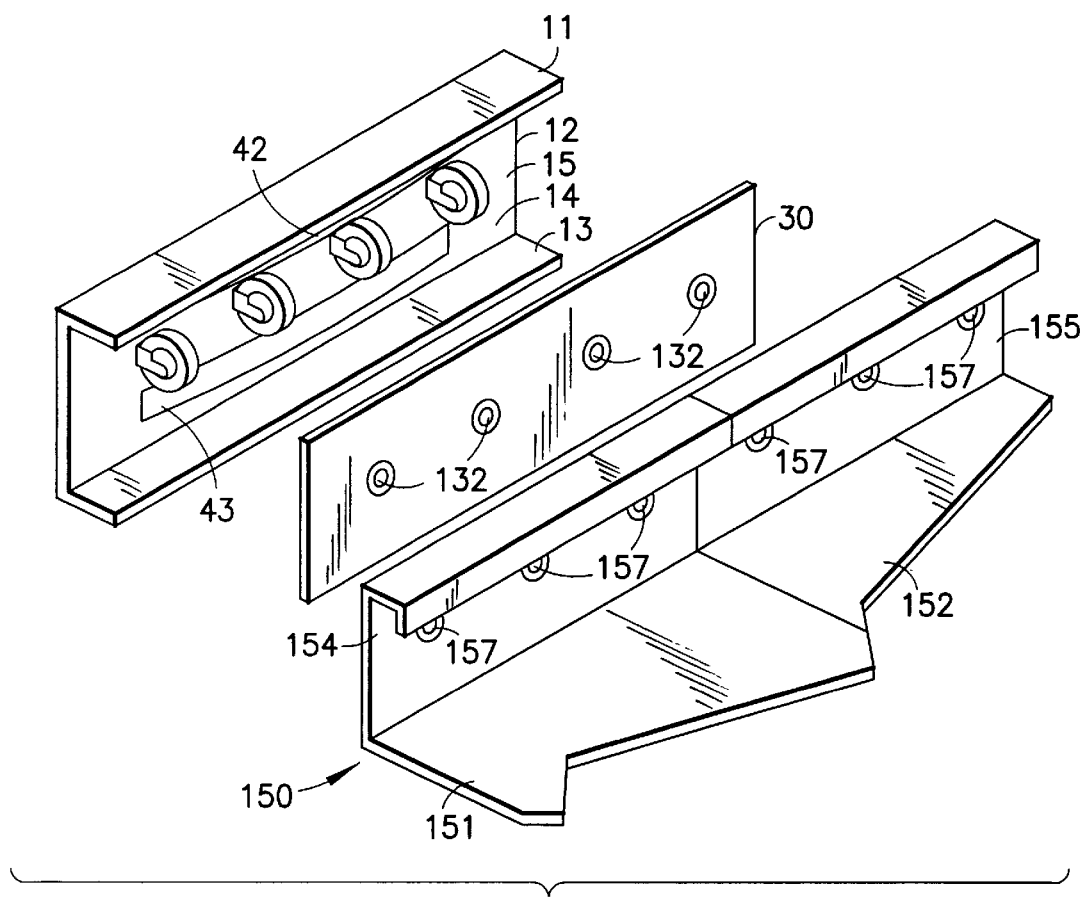
FIG. 12 is a perspective view of another embodiment of the invention.

As depicted in FIG. 12 of an alternate embodiment of the invention, biassing means 42, 43 are provided for urging the electrical conductive element 30 into abutment with the section of the support assembly when in the fitted position. As shown, the biassing means includes a pair of leaf springs 42 and 43 moulded into the main body.

To assemble the connector and tray sections together the copper strip 30 clips over the arrow shaped protrusions of the connector body. The arrow clips compress down to fit through the apertures of the copper strip and spring back into position after the copper strip is clipped to the connector body.

The leaf springs on the body force the copper strip forward. The connector is then pushed onto the tray sections. The arrow heads once again compress down and spring back into position to secure the connector and copper strip to the tray sections. whilst two leaf springs are illustrated it will be appreciated that there could be any suitable number. For example, four leaf springs could be provided of reduced length two being disposed above the fasteners in spaced relation to one another and two below.

Finally, it is to be understood that the inventive concept in any of its aspects can be incorporated in many different constructions so that the generality of the preceding description is not to be superseded by the particularity of the attached drawings. Various alterations, modifications and/or additions may be incorporated into the various constructions and arrangements of parts without departing from the spirit or ambition of the invention.

What is claimed is:

1. A connector for use in joining adjacent sections of a cable support assembly, the sections including a wall having connector mounting apertures therein; the connector including a main body and a plurality of fastener elements extending from a surface of the main body, each fastener element including a shank portion and a generally resiliently deformable head portion in the region of a free end of the shank portion; the head portion being deformable so that it can pass through the mounting apertures of the sections and subsequently adopt a configuration where retraction of the fastener head through the mounting aperture is inhibited, the connector further including biasing means adapted to cause a biasing force towards the walls of the sections of the cable support assembly when the connector is in a fitted position with the cable support assembly.

2. A connector according to claim 1 further including an electrical conductive element operatively connected to the main body whereby in the assembled position the electrical conductive element abuts against sections of the cable support assembly.

3. A connector according to claim 2 further including biassing means for urging said electrical conductive element into abutment with said section of the support assembly when the element and the support assembly are in the assembled position.

4. A connector according to claim 3 wherein the biassing means includes at least one leaf spring secured to said main body.

5. A connector according to claim 1, wherein said biassing means includes at least one substantially resilient tab in the main body of said connector, each tab being configured so that in said fitted position each tab causes said biassing force.

6. A connector according to claim 5 wherein each of said tabs includes a projecting portion which in an unstressed state projects from said main body.

7. A connector according to claim 6 wherein each of said tabs is in the form of a substantially U-shaped cut out portion of said main body of said connector.

8. A connector according to claim 7 wherein a free edge section of said U-shaped tab is of greater thickness than the remaining portion of said tab and thereby defines said projecting portion.

9. A connector according to claim 5 including at least two of said tabs, being oriented in reverse configuration relative to one another.

10. A connector according to claim 1 further including an electrical conductive element operatively connected to said main body so that in said fitted position said element abuts against said section of said cable support assembly and is urged in abutment by said biassing means.

11. A connector according to claim 1 wherein said main body includes a channel shaped plate including a main connector web and opposed flanges on opposite sides of the connector web, the flanges extending from the web with said surface thereof.

12. A connector according to claim 1, wherein said electrical conductive element includes a plate including mounting apertures therein through which said fastening elements pass for movement relative thereto.

13. A connector according to claim 1, wherein a head portion of each of said fastening elements is generally arrow shaped.

14. A connector according to claim 11 wherein said flanges form side rails which in a fitted position overlie the edges of said cable support sections.

15. A connector according to claim 1 wherein a head portion of each of said fastening elements is generally wedge shaped.

* * * * *